US012162401B2

(12) United States Patent
Liu et al.

(10) Patent No.: US 12,162,401 B2
(45) Date of Patent: *Dec. 10, 2024

(54) VEHICULAR LIGHTING USING PASSIVE AND/OR ACTIVE OPTICS

(71) Applicant: Zoox, Inc., Foster City, CA (US)

(72) Inventors: Da Liu, Milpitas, CA (US); Chang Gi Samuel Hong, San Francisco, CA (US); Andrew Mark Stieber, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,500

(22) Filed: Mar. 20, 2023

(65) Prior Publication Data
US 2023/0311746 A1 Oct. 5, 2023

Related U.S. Application Data

(63) Continuation of application No. 16/568,178, filed on Sep. 11, 2019, now Pat. No. 11,608,972.

(51) Int. Cl.
*B60Q 1/28* (2006.01)
*B60Q 1/30* (2006.01)
(Continued)

(52) U.S. Cl.
CPC ............. *B60Q 1/28* (2013.01); *B60Q 1/3015* (2022.05); *F21V 23/0464* (2013.01);
(Continued)

(58) Field of Classification Search
CPC .......... B60Q 1/28; B60Q 1/3015; B60Q 1/32; B60Q 1/34; B60Q 1/44; B60Q 1/48;
(Continued)

(56) References Cited

U.S. PATENT DOCUMENTS 10,744,936 B1 8/2020 Budhia et al.
11,242,972 B2 * 2/2022 Hong ...................... B60Q 1/30
(Continued)

FOREIGN PATENT DOCUMENTS

EP 3343096 A1 7/2018

OTHER PUBLICATIONS

Final Office Action dated Oct. 27, 2020 for U.S. Appl. No. 16/568,178, "Vehicular Lighting Using Passive and/or Active Optics", Liu, 7 pages.
(Continued)

*Primary Examiner* — Renan Luque
(74) *Attorney, Agent, or Firm* — Lee & Hayes, P.C.

(57) ABSTRACT

A reflector unit may behave as a retroreflector to reflect light of a selected color. The reflector unit may comprise a first reflector having a first color, a second reflector having a second color, and a mask that either allows incoming light to reach the first reflector and not the second reflector or allows incoming light to reach the second reflector and not the first reflector. An active light unit may emit light of a particular color in response to receiving light. In this fashion, the active light unit may simulate the operation of a reflector. The reflector unit and the active light unit may operate on a bi-directional vehicle.

17 Claims, 6 Drawing Sheets

(51) Int. Cl.

| | |
|---|---|
| *B60Q 1/32* | (2006.01) |
| *B60Q 1/34* | (2006.01) |
| *B60Q 1/44* | (2006.01) |
| *B60Q 1/48* | (2006.01) |
| *F21V 23/04* | (2006.01) |
| *H05B 47/105* | (2020.01) |
| *H05B 47/11* | (2020.01) |
| *G05D 1/00* | (2006.01) |

(52) U.S. Cl.
CPC .......... *H05B 47/105* (2020.01); *H05B 47/11* (2020.01); *B60Q 1/32* (2013.01); *B60Q 1/34* (2013.01); *B60Q 1/44* (2013.01); *B60Q 1/48* (2013.01); *B60Q 2400/20* (2013.01); *G05D 1/021* (2013.01)

(58) Field of Classification Search
CPC .......... B60Q 2400/20; B60Q 2300/32; B60Q 1/0023; B60Q 1/2603; B60Q 1/2607; B60Q 2300/11; B60Q 2300/42; B60Q 2300/43; B60Q 1/1423; B60Q 1/2696; F21V 23/0464; H05B 47/105; H05B 47/11; G05D 1/021; G02B 5/136
See application file for complete search history.

(56) References Cited

U.S. PATENT DOCUMENTS

| | | | |
|---|---|---|---|
| 2002/0093741 A1 | 7/2002 | Bechtel et al. | |
| 2004/0179367 A1 | 9/2004 | Takeda et al. | |
| 2006/0023461 A1 | 2/2006 | Knight | |
| 2008/0130302 A1* | 6/2008 | Watanabe | B60Q 1/085 362/466 |
| 2013/0242061 A1 | 9/2013 | Tsai et al. | |
| 2013/0335459 A1 | 12/2013 | Tokoo et al. | |
| 2014/0049645 A1 | 2/2014 | Wright et al. | |
| 2015/0002781 A1 | 1/2015 | Ma | |
| 2015/0078033 A1 | 3/2015 | Lee et al. | |
| 2016/0161650 A1 | 6/2016 | Taraschi et al. | |
| 2017/0045733 A1 | 2/2017 | Ren et al. | |
| 2017/0120804 A1 | 5/2017 | Kentley et al. | |
| 2017/0307177 A1* | 10/2017 | Groetsch | G02B 26/023 |
| 2018/0027634 A1 | 1/2018 | Dalavayi | |
| 2018/0093613 A1 | 4/2018 | Timoneda et al. | |
| 2018/0164157 A1 | 6/2018 | Pedersen et al. | |
| 2018/0222381 A1 | 8/2018 | Johnson et al. | |
| 2018/0255622 A1 | 9/2018 | Spero | |
| 2018/0328561 A1* | 11/2018 | Ohno | F21S 41/148 |
| 2019/0241119 A1 | 8/2019 | Takeda et al. | |
| 2019/0291278 A1 | 9/2019 | Hashiguchi | |
| 2019/0344703 A1 | 11/2019 | Morimura | |
| 2021/0071839 A1 | 3/2021 | Hong et al. | |
| 2021/0180772 A1 | 6/2021 | Liu et al. | |

OTHER PUBLICATIONS

Office Action for U.S. Appl. No. 16/568,178, mailed on Feb. 15, 2022, Liu, "Vehicular Lighting Using Passive and/or Active Optics", 5 pages.

Non Final Office Action dated Feb. 7, 2020 for U.S. Appl. No. 16/568,178 "Vehicular Lighting Using Passive and/or Active Optics" Liu, 12 pages.

Office Action for U.S. Appl. No. 16/568,166, mailed on Mar. 11, 2021, Hong, "Vehicular Lighting Using Passive and/or Active Optics", 15 pages.

Office Action for U.S. Appl. No. 16/568,178, mailed on Apr. 1, 2021, Liu, "Vehicular Lighting Using Passive and/or Active Optics", 15 pages.

The International Preliminary Report on Patentability for PCT Application No. PCT/US20/50541, mailed Mar. 24, 2022.

The PCT Search Report and Written Opinion mailed Dec. 23, 2020 for PCT application No. PCT/US20/50541, 14 pages.

* cited by examiner

VEHICULAR LIGHTING USING PASSIVE AND/OR ACTIVE OPTICS

CROSS REFERENCE TO RELATED APPLICATIONS

This application is a continuation of and claims priority to commonly assigned, co-pending U.S. patent application Ser. No. 16/568,178, filed Sep. 11, 2019. Application Ser. No. 16/568,178 is fully incorporated herein by reference.

BACKGROUND

Vehicles typically have multiple different types of lights and reflectors to illuminate the exterior of the vehicle. Such lights and reflectors allow a vehicle to be conspicuous and visible with respect to, for example, its presence, position, direction of travel, intended or actual change in direction or deceleration, and so on. Lights may shine steadily, blink, or flash, depending on their intended and regulated function. Reflectors are passive and reflect incident light from other vehicles or objects in the vicinity of the vehicle. Lights and reflectors are generally located on the vehicle pair-wise, one left and one right. The lights and reflectors on the front of the vehicle are often different than the lights and reflectors on the rear of the vehicle.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
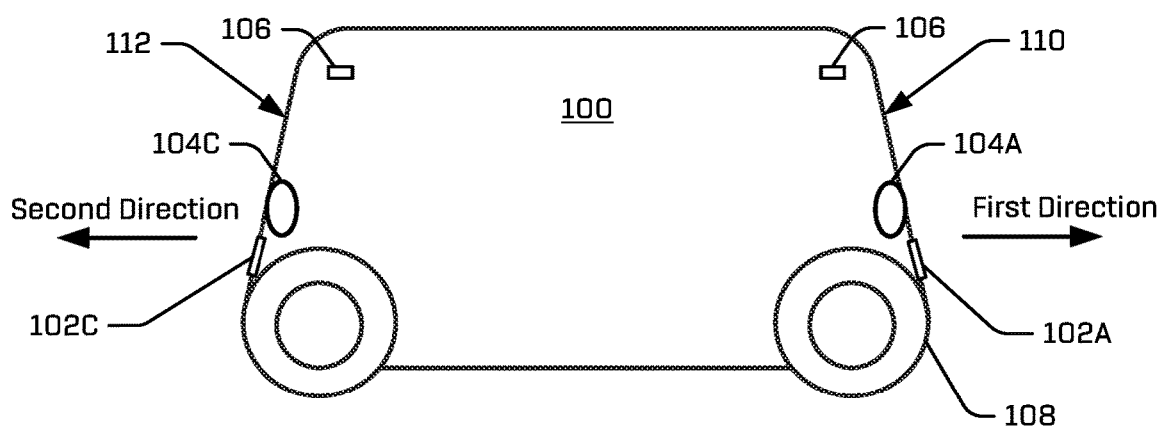
FIG. 1 is a schematic side view of an example vehicle with various lights and reflector units.

This disclosure relates to reflector units of a vehicle and techniques for controlling the reflector units. A system may include one or more of the reflector units and one or more controllers for operating the reflector units. This disclosure also relates to active light units and techniques for controlling the active light units. A system may include one or more of the active light units and one or more controllers for operating the active light units. While the reflector units and active light units are described separately herein, in some examples, systems may include both reflector units and active light units, and/or may include units that include aspects of both the reflector units and the active light units (e.g., active and passive aspects). As will be described in detail herein, there are various scenarios in which a purely passive reflector is inadequate to meet lighting/indicator requirements for operation. As one particular example, the Federal Motor Vehicle Safety Standards requires vehicle to have colored reflectors indicative of a leading or trailing end of a vehicle. For vehicles capable of operating symmetrically (e.g., being bi-directional), it is impossible to comply with such requirements by using traditional reflectors.

Herein, reflector units and active light units are collectively referred to as illumination units. That is, an illumination unit may be a reflector unit, an active light unit, or a combination of the two.

Each of the reflector units may operate to reflect light of one or more selected colors. For instance, a reflector unit may comprise, in some examples, a first reflector having a first color, a second reflector having a second color, and a mask such as a liquid crystal display (LCD) that either allows incoming light to reach the first reflector and not the second reflector or allows incoming light to reach the second reflector and not the first reflector. The LCD, or other device (e.g., multi-segment display, quantum dot display, electroluminescent display, and so on), performs such a reflector selection for the incoming light by having a portion of its pixels block the light and another portion of its pixels transmit the light. In this fashion, the reflector unit either reflects the incoming light as the first color or as the second color. In other words, the reflector unit may behave as a reflector having the first color or as a reflector having the second color, such a selection being based on the pattern or distribution of transmissive pixels and opaque (e.g., reflecting, non-transmissive) pixels of the LCD. If the reflector unit is implemented on a bi-directional vehicle, for example, functionality (e.g., color and/or intensity) of the reflector unit may change depending on direction of travel of the vehicle (or most recent direction of travel in the situation where the vehicle is parked or stationary). Of course, any number of colors is contemplated and may be achieved based on particular selectable (drivable) patterns of such an LCD (or similar device) in a similar fashion as described herein. In some examples, multi-colored LCD pixels may themselves be used to provide such desired colors. In such examples, light may be emitted and/or reflected off of colored pixels of an LCD itself, thereby providing the desired reflected light.

Herein, the term "reflector" may, in some examples, refer to a retroreflector, which is an optical device or surface that reflects radiation (e.g., light) back toward its source with a minimum of scattering. In a retroreflector, the wavefront of the radiation is reflected straight back to the wavefront source for a relatively wide range of angles of incidence. Retroreflectors are often used on vehicles and for road signs. However, any reflective material is contemplated.

In some examples, an LCD (e.g., mask) of a reflector unit may be a bi-stable LCD, which uses power to change an image of its display. Once power is removed, the image of the bi-stable LCD can remain for relatively long periods (e.g., indefinitely) without the use of additional power. In contrast, a non-bi-stable LCD generally uses a constant source of power to maintain an image. In other examples, other bi-stable or low power display technologies may be used to implement techniques such as those described herein. Use of such bi-stable technologies provides an improvement to the technical problem of how to ensure a vehicle is compliant with lighting regulations when there is a loss of power. For example, in a bi-directional vehicle where reflectors need to be altered depending on a direction of travel, if a loss of power/communication to such LCD reflectors occurs, the vehicle will not be able to indicate the desired direction of travel. In such examples, by using bi-stable LCDs (or similar), the vehicle may continue to operate and be in compliance with regulations despite loss of power to the units by restricting travel to a single direction.

In other examples, a reflector unit may incorporate a mask that is a mechanical, movable shutter (e.g., in lieu of, or in addition to, the LCD described above). In detail, such a reflector unit may comprise a first reflector having a first color, a second reflector having a second color, and a mechanical shutter that either allows incoming light to reach the first reflector and not the second reflector or allows incoming light to reach the second reflector and not the first reflector. Thus, the reflector unit either reflects the incoming light as the first color or as the second color. In other words, the reflector unit may behave as a reflector having the first color or as having the second color, such a selection being based on the image of the LCD. In some examples, a mechanical, movable shutter may be used which allows incoming light to reach a single reflector in a first, open state (e.g., when an end of the vehicle on which the reflector is installed is a trailing end of the vehicle) and blocks incoming light from reaching the single reflector in a second, closed state (e.g., when the end of the vehicle on which the reflector is installed is a leading end of the vehicle). As above, such a mechanical reflector may be used for any number of colors (one, two, or more).

In other examples, a reflector unit may comprise a first reflector having a first color, a second reflector having a second color and, instead of a mechanical shutter described above, a light controller that either allows incoming light to reach the first reflector and not the second reflector or allows incoming light to reach the second reflector and not the first reflector.

A reflector unit, such as that described above, provides a functionality of a reflector having a particular color that is selectable as needed during operation of a vehicle. For example, a first reflector unit may be placed on a first end of a bi-directional vehicle and a second reflector unit may be placed on the other (second) end of the bi-directional vehicle. If the vehicle is travelling so that the first end of the vehicle is leading the second end, then the first reflector unit may function to behave as a white reflector. Also, the second reflector unit may function to behave as a red reflector. On the other hand, if the vehicle is travelling so that the second end of the vehicle is leading the first end, then the first reflector unit may function to behave as a red reflector, and the second reflector unit may function to behave as a white reflector.

In some examples, a reflector unit may be located on a vehicle just below each headlight or tail light of the vehicle. In some implementations, a particular type of light unit may operate as either a headlight or a tail light for a bi-directional vehicle, depending on the direction of travel. For instance, a light unit on the first end of a vehicle may operate as a headlight when the first end is the front end of the vehicle and may operate as a tail light when the first end is the rear end of the vehicle. Thus, just as such a light unit can change its function, so too can a reflector unit.

This disclosure also relates to an active light unit configured to operate on a vehicle. The active light unit may operate to produce particular colored light in response to receiving and sensing incoming light. Such operation is similar to that of a reflector, which also "produces" light in response to receiving incoming light. An active light unit, however, may produce (e.g., emit) light of a color that is independent of the color of the incoming light. This is in contrast to a reflector, which merely reflects the incoming light to "produce" the emitted light.

The active light unit may comprise a light source configured to, when activated, generate and project (e.g., emit) light toward a region external to the active light unit. The active light unit also comprises a photosensor (or a plurality of photosensors) or other detectors configured to detect light incoming from the region external to the active light unit. An electronic controller is configured to activate the light source in response to the photosensor detecting the light. As a non-limiting example, upon detecting white light, the "reflector" may determine to emit red light (e.g., in response to determining another vehicle's headlights are shining on the reflector). In a similar example, white light may be emitted in response to detecting red light (e.g., a pseudo-headlight may be created in response to detecting the tail lights of another vehicle to the front). The color and/or intensity of light emitted by the active light unit may be determined or controlled independently of the light received by the light unit. In at least some examples, such light emission may be produced by a single, multi-wavelength source, whereas in other examples, such emission may be generated based at least in part on multiple sources. In some examples, such lighting may be independent of detected light and may be determined based on a direction of travel as indicated from, for example, a vehicle controller. Thus, the active light unit is able to mimic the behavior of a reflector of a particular color. In other words, the active light unit provides a functionality of a reflector having a particular color that may be controlled as needed during operation of a vehicle. For example, a first active light unit may be placed on a first end of a bi-directional vehicle and a second active light unit may be placed on the other (second) end of the bi-directional vehicle. If the vehicle is travelling so that the first end of the vehicle is leading the second end, then the first active light unit may function to behave as a white reflector for the front of a vehicle. Also, the second active light unit may function to behave as a red reflector for the rear of a vehicle. On the other hand, if the vehicle is travelling so that the second end of the vehicle is leading the first end, then the first active light unit may function to behave as a red reflector for the rear of a vehicle, and the second active light unit may function to behave as a white reflector for the front of the vehicle.

An active light unit may include various light sources. For example, a first light source may be a white light source and a second light source may be a red light source. Such light sources may be semiconductor light sources such as light emitting diodes (LEDs). In some implementations, a light source may comprise red, green, and/or blue LEDs that, in combination, can produce a relatively large color gamut of light.

Figure 2:
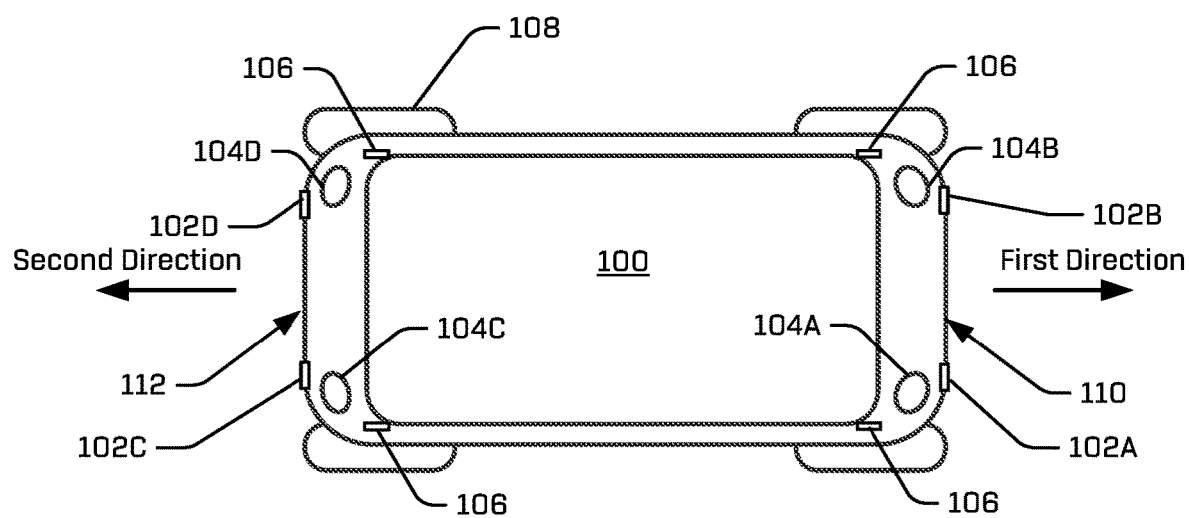
FIG. 2 is a schematic top view of the example vehicle of FIG. 1.

FIG. 1 is a schematic side view of an example vehicle 100 and FIG. 2 is a schematic top view of the vehicle, which includes various illumination units 102A, 102B, 102C, and 102D (collectively "illumination units 102"). Vehicle 100 is illustrated to also include light units 104A, 104B, 104C, and 104D (collectively "light units 104") and various other lighting 106. In other examples, illumination units 102, lighting units 104, and/or other lighting 106 may be located at locations of vehicle 100 other than what is indicated in FIGS. 1 and 2. In some examples, vehicle 100 may be an autonomous vehicle configured to operate according to a Level 5 classification issued in 2016 by the U.S. National Highway Traffic Safety Administration, for example, which describes a vehicle capable of performing all safety-critical functions for an entire trip, with the driver (or occupant) not being expected to control the vehicle at any time. In that case, since the vehicle may be configured to control all functions from start to stop, including all lighting functions, it may be unoccupied. This is merely an example, however, and the systems and methods described herein may be incorporated into any ground-borne vehicle, including those that are manually driven by a human and those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions. Of course, such techniques need not be implemented in a vehicle at all and may be implemented in various systems and apparatuses.

Vehicle 100, as an example, is an automobile having four wheels/tires 108. Other types and configurations of vehicles are contemplated, such as, for example, vans, sport utility vehicles, crossover vehicles, trucks, buses, agricultural vehicles, and construction vehicles. Vehicle 100 may be powered by one or more internal combustion engines, electric motors powered by one or more power supplies (e.g., batteries, hydrogen fuel cells, etc.), or any combination thereof. In addition, although vehicle 100 is illustrated to have four wheels/tires 108, the systems and methods described herein may be incorporated into vehicles having fewer or a greater number of wheels, tires, and/or tracks. Vehicle 100 has four-wheel steering and may operate generally with equal performance characteristics in all directions, for example, such that a first end 110 of vehicle 100 is the front end of the vehicle when traveling in a first direction, and such that first end 110 becomes the rear end of the vehicle when traveling in the opposite, second direction, as illustrated in FIGS. 1 and 2. Similarly, a second end 112 of the vehicle is the front end of the vehicle when traveling in the second direction, and second end 112 becomes the rear end of the vehicle when traveling in the opposite, first direction. These example characteristics may facilitate greater maneuverability, for example, in small spaces or crowded environments, such as parking lots and urban areas. Thus, because of a bi-directionality of vehicle 100, each of illumination units 102 may sometimes operate as a red reflector or indicator (e.g., red color associated with the rear of a vehicle) while at other times operating as a white reflector or indicator (e.g., white color associated with the front of a vehicle). In some implementations, bi-directionality of vehicle 100 may also lead to each of light units 104 sometimes operating as a headlight while at other times operating as a tail light, brake light, turn signal, and so on.

In some examples, vehicle 100 may include a primary processing unit (not illustrated in FIGS. 1 and 2) and a secondary processing unit connected to various electrical and mechanical components of the vehicle via a suitable communications network (e.g., a controller area network (CAN), or any other suitable wired or wireless communication).

By way of example and not limitation, vehicle 100, as described herein, may include a body module, a first drive module coupled to a first end of the body module, and a second drive module coupled to a second end of the body module, as described, for example, in U.S. patent application Ser. No. 16/408,395, filed May 9, 2019, entitled "Multi-use Headlamps and System", which is herein incorporated by reference in its entirety. The body module may include a passenger compartment to house one or more passengers. The body module also includes a processing unit, such as that described above, to control operation of the vehicle. A first light controller may be coupled or be part of the first drive module and a second light controller may be coupled to or be part of the second drive module. The first light controller may be physically and/or spatially separated from the second light controller. For example, the first light controller may be disposed closer to the first end of the vehicle than to the second end of the vehicle, and the second light controller may be disposed closer to the second end of the vehicle than to the first end of the vehicle.

Vehicle 100 may include one or more sensors to sense objects surrounding the vehicle or conditions of the vehicle. These sensors may be located on the body module, the drive modules, or some sensors may be located on the body module while other sensors are located on the drive modules. Examples of sensors that may be included on the body module, the drive modules, or both include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like.

Figure 3:
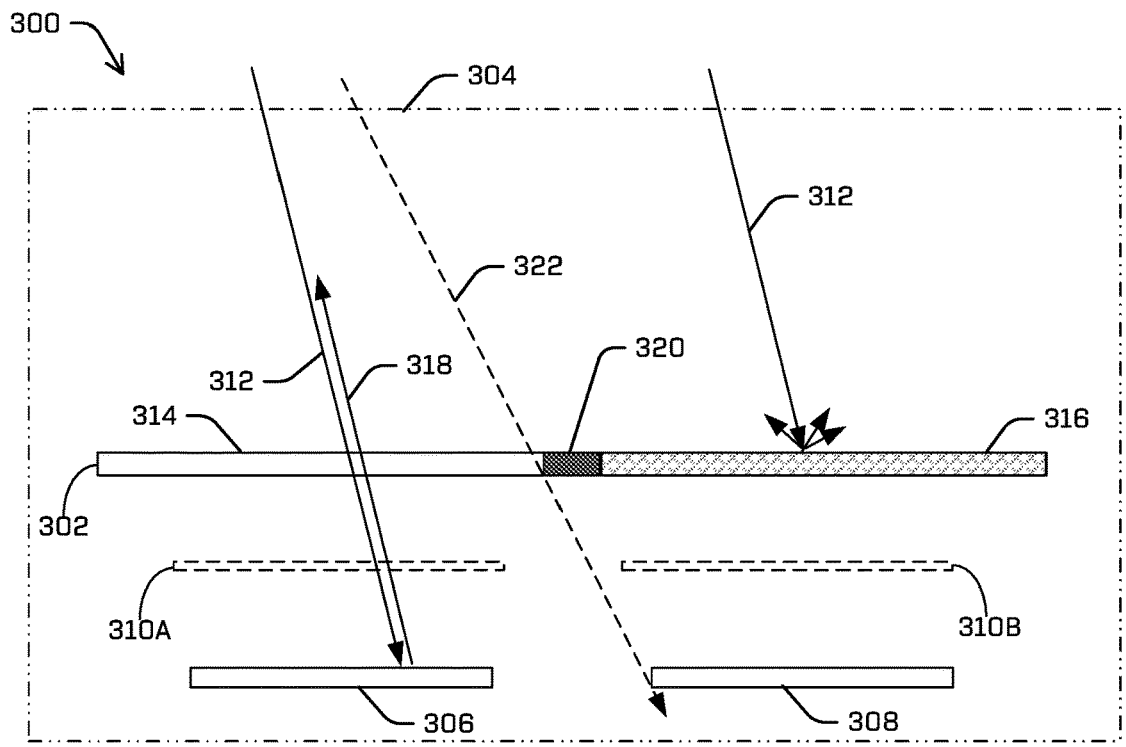
FIG. 3 is a schematic cross-sectional view of an example reflector unit illustrating an LCD allowing light to reach one of two reflectors.
Figure 4:
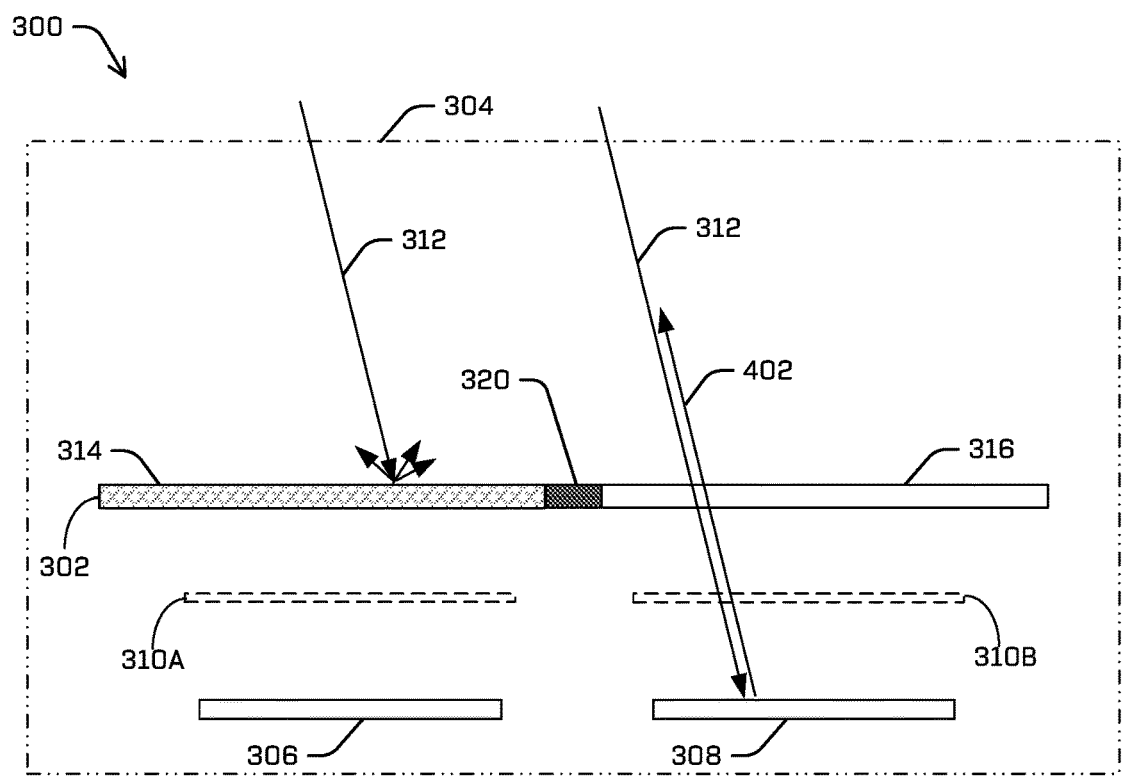
FIG. 4 is a schematic cross-sectional view of the example reflector unit of FIG. 3 illustrating the LCD allowing light to reach the other of the two reflectors.

FIG. 3 is a schematic top view of an example reflector unit 300 for a vehicle illustrating an LCD 302 allowing light to reach one of two reflectors. FIG. 4 is a schematic top view of example reflector unit 300 illustrating LCD 302 allowing light to reach the other of the two reflectors. In some implementations, reflector unit 300, LCD 302, and the two reflectors (or, optionally, a single reflector, as described below), may be contained in a housing 304 that is attachable to the body of the vehicle. The two reflectors as illustrated comprise a first reflector 306 and a second reflector 308. In some implementations, first reflector 306 and second reflector 308 may be a single reflector having two or more portions of different colors. Here, color of a reflector refers to the color of light that exits the reflector. For example, a reflector may comprise a colored plastic material that reflects only a portion of the spectrum of incoming white light, wherein the portion corresponds to the color of the reflector. In some implementations, first reflector 306 and second reflector 308 may comprise one or more reflectors that do not introduce color to incoming white light. Instead (or additionally), one or more color filters 310 (e.g., 310A and 310B) may be disposed in front of the reflector(s) to introduce a color to the reflected (and/or transmitted) incoming white light. In some implementations, one color may be red and another color may be white. In the latter case, the reflector (e.g., 306 or 308) may comprise a clear material that does not introduce a color, so that incoming white light remains white upon reflection by the reflector. Also in the latter case, a color filter (e.g., 310) need not be present.

The example situation in FIG. 3 demonstrates how reflector unit 300 may behave as a reflector having a first color (e.g., red) based on operation of LCD 302. The example situation in FIG. 4 demonstrates how reflector unit 300 may behave as a reflector having a second color (e.g., white or clear) based on operation of LCD 302. Whether the first color or the second color is selected (via control of LCD 302) may depend on the direction the (bi-directional) vehicle is travelling, as described above (e.g., as may be received from a controller). In FIG. 3, incoming light 312, originating from external to housing 304, is incident on LCD 302. As described below, LCD 302 may be controlled to have its various portions (e.g., pixels or groups of pixels) transmissive or non-transmissive (e.g., absorptive and or reflective). In the case of FIG. 3, LCD 302 includes a first portion 314 that is transmissive and a second portion 316 that is non-transmissive. Thus, incoming light 312 transmits through first portion 314 of LCD 302 and is incident on first reflector 306, which consequently retro-reflects incoming light 312 as reflected light 318. If first reflector 306 has the first color, then reflected light 318 assumes that color. If color filter 310A is used (e.g., wherein first reflector 306 is uncolored), then reflected light 318 assumes the color of the color filter (e.g., the first color). Incoming light 312 incident on non-transmissive second portion 316 of LCD 302 is blocked from reaching second reflector 308. This blocked light may be scattered away from LCD 302 (e.g., as illustrated) and/or absorbed by LCD 302. Accordingly, reflector unit 300 behaves as a reflector having the first color (of first reflector 306).

In FIG. 4, incoming light 312, originating from external to housing 304, is incident on LCD 302. LCD 302 may be controlled to have its various portions (e.g., pixels or groups of pixels) transmissive or non-transmissive (e.g., absorptive and or reflective). In the case of FIG. 4, LCD 302 includes first portion 314 that is non-transmissive and second portion 316 that is transmissive (in contrast to the situation in FIG. 3). Thus, incoming light 312 transmits through second portion 316 of LCD 302 and is incident on second reflector 308, which consequently retro-reflects incoming light 312 as reflected light 402. If second reflector 308 has the second color, then reflected light 402 assumes that color. If color filter 310B is used (e.g., wherein second reflector 308 is uncolored), then reflected light 402 assumes the color of the color filter (e.g., the second color). Incoming light 312 incident on non-transmissive first portion 314 of LCD 302 is blocked from reaching first reflector 306. This blocked light may be scattered away from LCD 302 (e.g., as illustrated) and/or absorbed by LCD 302. Accordingly, reflector unit behaves as a reflector having the second color (of second reflector 308).

In some examples, LCD 302 may include a portion to act as a light-blocking element 320. In other examples, the light-blocking element may be separate from LCD 302 and located in front of or behind the LCD. In either case, such a light-blocking element is located so as to prevent light from reaching a reflector that is intended to not be illuminated by incoming light 312. For example, in the situation depicted in FIG. 3, a maximum acceptance angle of LCD 302 may unintentionally allow incoming light 312 to reach second reflector 308. Light-blocking element 320, however, prevents this from happening. Light ray 322 is an example of a portion of incoming light 312 incident at a maximum LCD acceptance angle being blocked from reaching second reflector 308. Accordingly, the position and/or size (e.g., width) of light-blocking element 320 may depend, at least in part, on the acceptance angle of LCD 302 and/or a distance between the bi-stable LCD and the first and second reflectors 306 and 308.

In some implementations, LCD 302 may be a bi-stable LCD, which generally only consumes power to change from one state to another state. Once power is removed, the state of the bi-stable LCD can remain for relatively long periods (e.g., indefinitely). For example, if LCD 302 is bi-stable, then LCD 302 need not consume power to maintain the state (e.g., first portion 314 being transmissive and second portion 316 being non-transmissive) illustrated in FIG. 3. To change from this state to the state illustrated in FIG. 4, however, generally consumes power. But once the new state is achieved, power is no longer needed (to maintain the second state). In such an example, a bidirectional vehicle may continue to comply with functional safety requirements, despite such a loss of power. Furthermore, though discussed in the context of allowing/blocking light from reaching a reflector, it should be understood that in some examples, such LCD units may comprise the retroreflectors themselves (which, in some examples, may comprise the LCD unit being colored, as desired, in particular patterns). Additionally, though described in the context of LCD's with respect to FIGS. 3 and 4, it should be noted that any electrochromic material (or the like) capable of optionally/selectively transmitting and reflecting light is contemplated.

Figure 5:
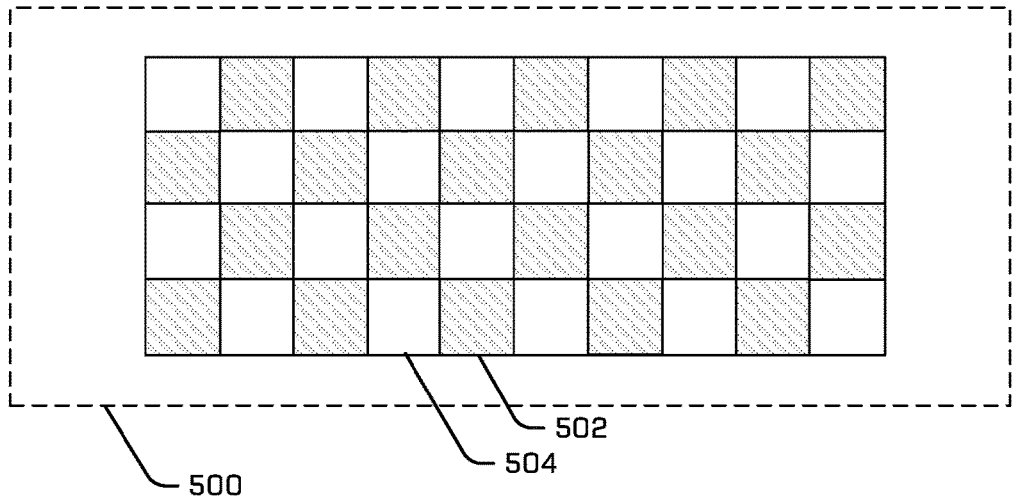
FIG. 5 is a front view showing an example pattern of a reflector of a reflector unit.

FIG. 5 illustrates an example pattern of a reflector 500 of a reflector unit for a vehicle. For instance, reflector 500 may be used in a reflector unit instead of two separate reflectors (e.g., first reflector 306 and second reflector 308 of reflector unit 300). In the case illustrated in FIG. 5, reflector 500 has a checkerboard pattern of alternating regions 502 of a first color (e.g., red) and regions 504 of a second color (e.g., white or clear). In such an example, reflector 500 comprises portions (502 and 504) that are not contiguous with one another. In other words, regions 502 are interleaved with regions 504. This is in contrast to the situation depicted in FIGS. 3 and 4, where each of first reflector 306 and second reflector 308 are a single continuous color (or clear). An LCD (e.g., LCD 302) of the reflector unit may have a pattern corresponding to the pattern of reflector 500. Such a pattern of the LCD may alternately block incoming light from reaching regions 502 or regions 504 of reflector 500 depending, for example, on the direction of travel of the vehicle.

Figure 6:
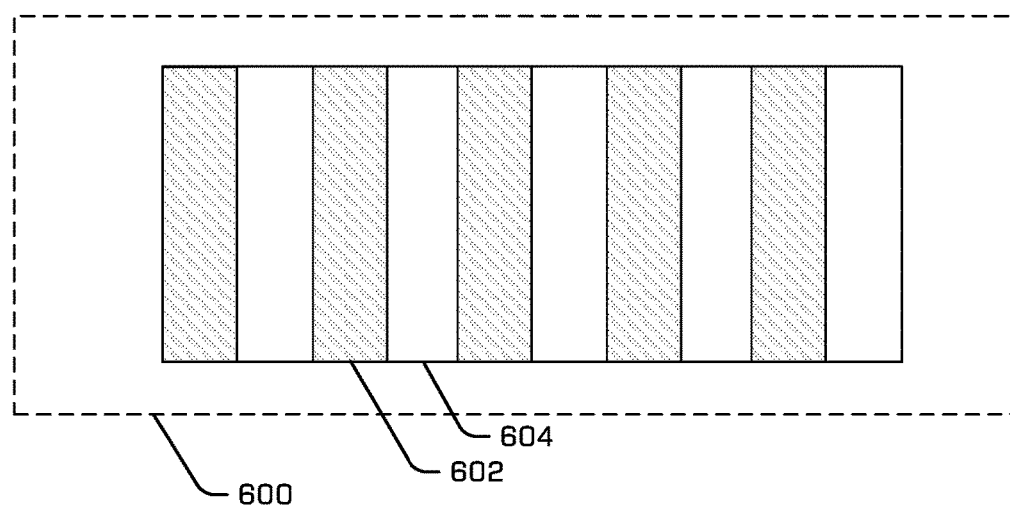
FIG. 6 is a front view showing another example pattern of a reflector of a reflector unit.
Figure 7:
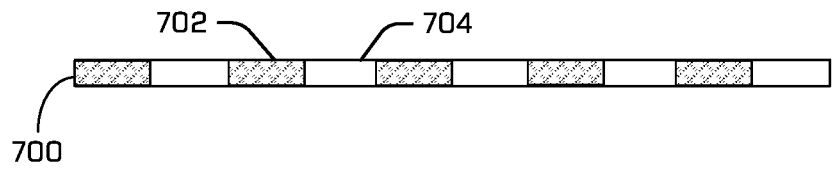
FIG. 7 is a schematic cross-sectional view of an LCD reflector unit displaying an example pattern for alternately transmitting and blocking light travelling toward a reflector.

FIG. 6 illustrates an example pattern of a reflector 600 of a reflector unit for a vehicle. For instance, reflector 600 may be the same as or similar to first reflector 306 or second reflector 308 of reflector unit 300. In the case illustrated in FIG. 6, reflector 600 has a striped pattern of alternating regions 602 (e.g., red) and regions 604 (e.g., white or clear). FIG. 7 illustrates an LCD 700, which may be similar to or the same as LCD 302 of the reflector unit having a pattern corresponding to the pattern of reflector 600. Such a pattern of the LCD may alternately block incoming light from reaching regions 602 or regions 604 of reflector 600 depending, for example, on the direction of travel of the vehicle. Thus, the striped pattern of LCD 700 may include regions 702 and 704, respectively corresponding to regions 602 and regions 604 of the reflector. If regions 702 are selected to be non-transparent and regions 704 are selected to be transparent, then regions 702 prevent incoming light from reaching regions 602 of the reflector and regions 704 allow the incoming light to reach regions 604.

Figure 8:
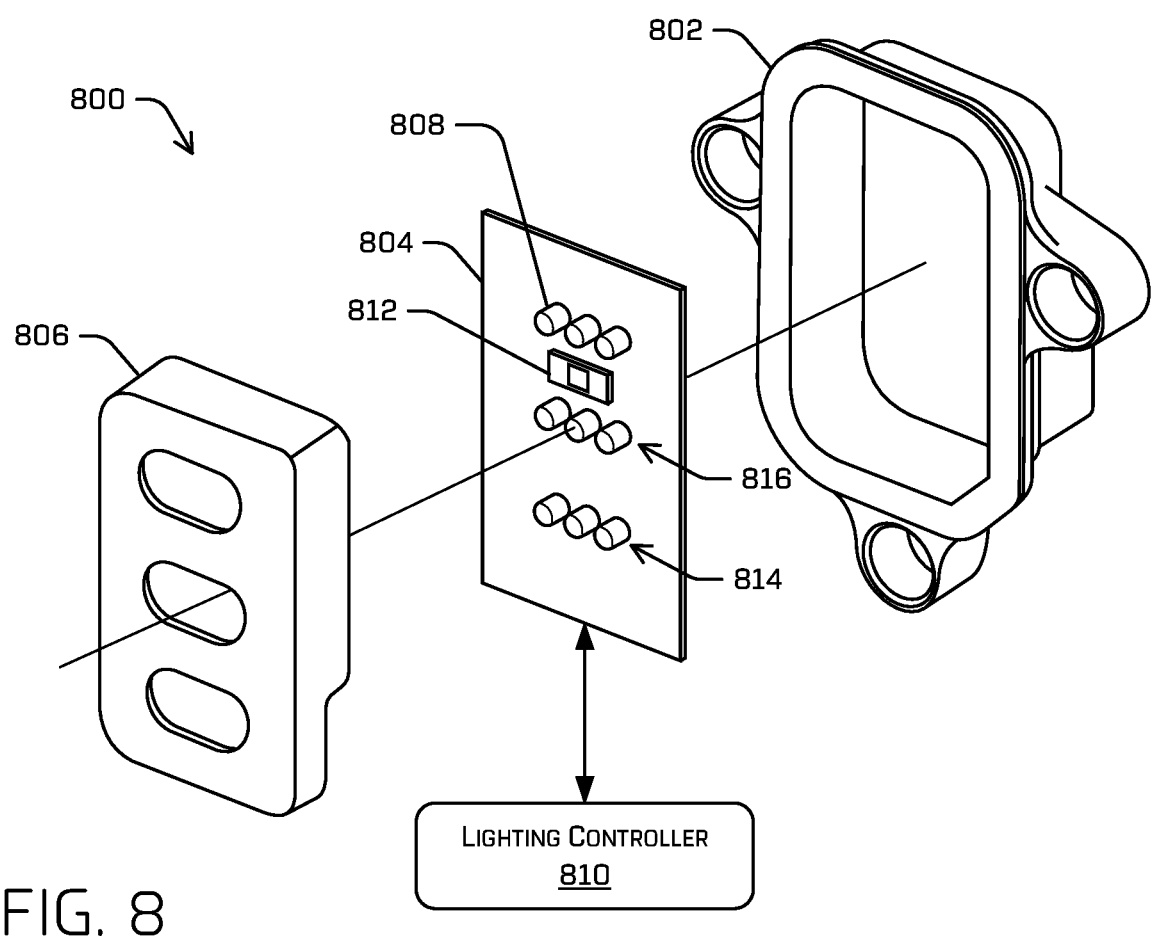
FIG. 8 is a perspective view of an example active light system.

FIG. 8 is a perspective, exploded view of an example active light unit 800 for a vehicle and may be the same as or similar to active light units 102 illustrated in FIGS. 1 and 2. Light generated and emitted by active light unit 800 is based on detection and/or measurement of light incoming from external to the active light unit. Additionally, light generated and emitted by active light unit 800 may also, or instead, be based on a direction of vehicle travel. For example, as a result of detecting incoming light, active light unit 800 may generate and emit light. On the other hand, as a result of detecting an absence of incoming light (or such light being below a threshold amount), active light unit 800 may cease to emit light. In a particular example for which active light unit 800 is located on the rear of the vehicle, as a result of detecting incoming light, active light unit 800 may generate and emit red light. On the other hand, if active light unit 800 is located on the front of the vehicle, as a result of detecting incoming light, active light unit 800 may generate and emit white light.

Active light unit 800 may include a rear housing 802, an optoelectronic board 804, and a front housing 806. Rear housing 802 may be configured to receive optoelectronic board 804 and be mountable to the vehicle. Front housing 806, which may be attached to rear housing 802 to contain optoelectronic board 804, may include transparent or translucent covers and/or lenses (not illustrated) to allow light generated by light sources 808 on optoelectronic board 804 to exit the active light unit.

In some examples, active light unit 800 may be part of a system comprising light sources 808 configured to, when activated, generate and project colored light toward a region external to the active light unit. The system may also include a lighting controller 810 and a photosensor 812 configured to detect light incoming from the region external to the active light unit. Controller 810, which may be located anywhere in the vehicle and need not be located in active light unit 800, may receive an electronic signal from photosensor 812 and determine intensity of the incoming light represented by the electronic signal from the photosensor. As a result, controller 810 may operate light sources 808 based at least in part on the intensity of the light. For example, controller 810 may control a brightness of the light sources 808 based, at least in part, on a magnitude of the electronic signal from photosensor 812.

Optoelectronic board 804 of active light unit 800 includes light sources 808 comprising LED's of various colors (e.g., red and white). Additionally, each of light sources 808 may be configured to have particular optical characteristics, such as brightness, angular distribution of intensity, and color temperature (e.g., for the white color), just to name a few examples. Such particular optical characteristics may be designed or determined based, at least in part, on one or more various (e.g., government) standards or regulations. For example, distribution of intensity (e.g., irradiance, illuminance, etc.) of various light output may be measured based on the distance standards or regulations. Light sources 808 may be configured to, when activated, generate and project light toward a region external to active light unit 800. LED light sources may comprise single LEDs or groups of two or more LEDs (e.g., three individual red LEDs and three individual white LEDs. As illustrated, light sources 808 are in various locations on optoelectronic board 804. In some examples, a first row 814 of LED light sources may comprise white LEDs, a second row 816 of LED light sources may comprise red LEDs, and so on. In some implementations, optoelectronic board 804 may be a printed circuit board (PCB) with circuitry for energizing the LEDs.

In addition to light sources 808, optoelectronic board 804 may include photosensor 812 (or may include two or more such photosensors) or other type of light detecting/measuring element. In some examples, photosensor 812 may be configured to detect light incoming from a region external to active light unit 800. As described above, controller 810 may be configured to activate light sources 808 in response to photosensor 812 detecting the incoming light. In some examples, controller 810 may be configured to activate a subset of light sources 808 based, at least in part, on a direction of travel of the vehicle. Such a subset may comprise red LEDs or white LEDs. For example, if the subset of light sources 808 comprises red LEDs that are located on a tail end of the vehicle, controller 810 may operate the red LEDs to be active in response to photosensor 812 detecting light incoming from the region external to the active light unit while a direction of travel of the vehicle comprises the tail end of the vehicle being behind a front end of the vehicle. In this fashion, active light unit 800 behaves, in a sense, similar to a red reflector, wherein incoming light results in outgoing red light. However, instead of the outgoing red light originating from the incoming (white) light being reflected, the outgoing red light is generated by the LEDs of the active light unit.

In another example, if the subset of light sources 808 comprises white LEDs that are located on a front end of the vehicle, controller 810 may operate the white LEDs to be active in response to photosensor 812 detecting light incoming from the region external to the active light unit while a direction of travel of the vehicle comprises the front end of the vehicle being ahead of the rear end of the vehicle. In this fashion, active light unit 800 behaves, in a sense, similar to a white reflector, wherein incoming light results in outgoing white light. However, instead of the outgoing white light originating from the incoming (white) light being reflected, the outgoing white light is generated by the LEDs of the active light unit.

In an example, more than one active light unit 800 may be located in different parts of a vehicle. For instance, a first active light unit 800 may be located in a first part of the vehicle and a second active light unit 800 may be located in a second part of the vehicle. A controller (e.g., 810 and/or 1012, introduced below) may be configured to determine a directionality of incoming light based at least in part on a first electronic signal from a first photosensor of first active light unit and a second electronic signal from a second photosensor of second active light unit.

In an example, a controller may be configured to determine the type of incoming light and/or its source based at least in part on characteristics of the incoming light as measured by photosensor 812, which in some examples may be spectrally sensitive (e.g., include optical bandpass filtering) so as to be able to measure intensity as a function of wavelength. For instance, a controller may determine, based on the optical properties, if the incoming light is from another vehicle or from sunlight. Such optical properties may include spectra and/or intensity (e.g., spectral distribution) of the incoming light. Determining the type of light may be useful, for example, for conserving electrical power of the vehicle. For example, the controller may activate or maintain an active state of light sources 808 if incoming light is from another vehicle and deactivate or maintain an off state of the light sources if the light is from sunlight.

In some examples, active light unit 800 may include physical baffles, which may comprise a portion of front housing 806, that may at least partially block light from reaching photosensor 812, based on direction of the light. Thus, light incident within a range of angles may reach the photosensor while light incident outside such a range will not reach the photosensor. In this way, the active light unit 800 may be configured to respond to, for example, headlights from another vehicle while not responding to ambient indirect light such as sunlight.

Figure 9:
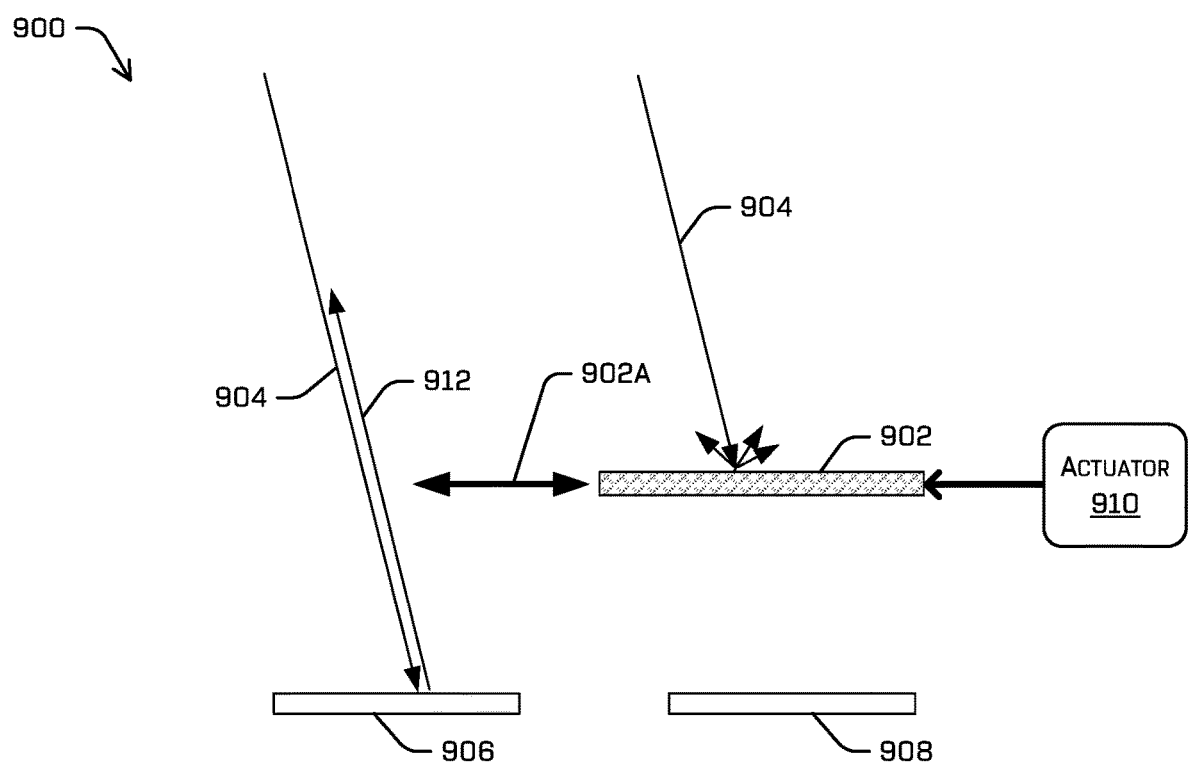
FIG. 9 is a schematic cross-sectional view of an example reflector unit illustrating a moveable shutter allowing light to reach one of two reflectors.

FIG. 9 is a schematic top view of an example reflector unit 900 for a vehicle, illustrating a moveable shutter 902 allowing incoming light 904 to reach one of two reflectors, reflector 906, while preventing light from reaching the other of the two reflectors, reflector 908. An arrow 902A indicates a direction that moveable shutter travels when changing its position from allowing incoming light 904 to reach reflector 906 to allowing the incoming light to reach reflector 908, and vice versa. An actuator 910 may be used to initiate and/or control motion of moveable shutter 902. Actuator 910 may be, for example, a motor or type of mechanical linkage able to movement of moveable shutter 902.

The example situation in FIG. 9 demonstrates how reflector unit 900 may behave as a reflector having a first color (e.g., of reflector 906) or as a reflector having a second color (e.g., of reflector 908) based on operation of moveable shutter 902. Whether the first color or the second color is selected may depend on the direction the (bi-directional) vehicle is travelling, as described above.

As illustrated, moveable shutter 902 is in a position to allow incoming light 904, originating from external to a housing (not illustrated) for reflector unit 900, to reach reflector 906 while preventing incoming light 904 from reaching reflector 908. Thus, incoming light 904 is incident on reflector 906, which consequently retro-reflects incoming light 904 as reflected light 912. If reflector 906 has the first color, then reflected light 912 assumes that color. If a color filter (not illustrated in FIG. 9) is used (e.g., wherein reflector 906 is uncolored), then reflected light 912 assumes the color of the color filter (e.g., the first color). Incoming light 904 incident on moveable shutter 902 is blocked from reaching reflector 908. This blocked light may be scattered away from the moveable shutter (e.g., as illustrated) and/or absorbed by the moveable shutter. Accordingly, reflector unit 900 behaves as a reflector having the first color (of reflector 906).

In some implementations, movement of moveable shutter 902 may be performed directly by an electric motor. In other implementations, movement of moveable shutter 902 may be performed by air flow in conduits, wherein the air flow is used to perform movement of moveable shutter 902. Air flow may be controlled by valves in the conduit(s), which may be operated by one or more electric motors.

In at least some examples, actuator 910 may be controlled based at least in part on a signal indicative of a direction of travel of the vehicle. In at least some examples, such a movable shutter (and/or reflective portion) may allow for a vehicle employing such techniques to remain in compliance with lighting requirements despite losing power.

In some examples, the reflective portion may be moveable and moved to be visible or occluded by a shuttering region (e.g., such that incoming light is selectively reflected off of a movable surface). Of course, in any example enumerated herein, the number of colors and reflectors may be varied (e.g., one, two, more than two, etc.).

Figure 10:
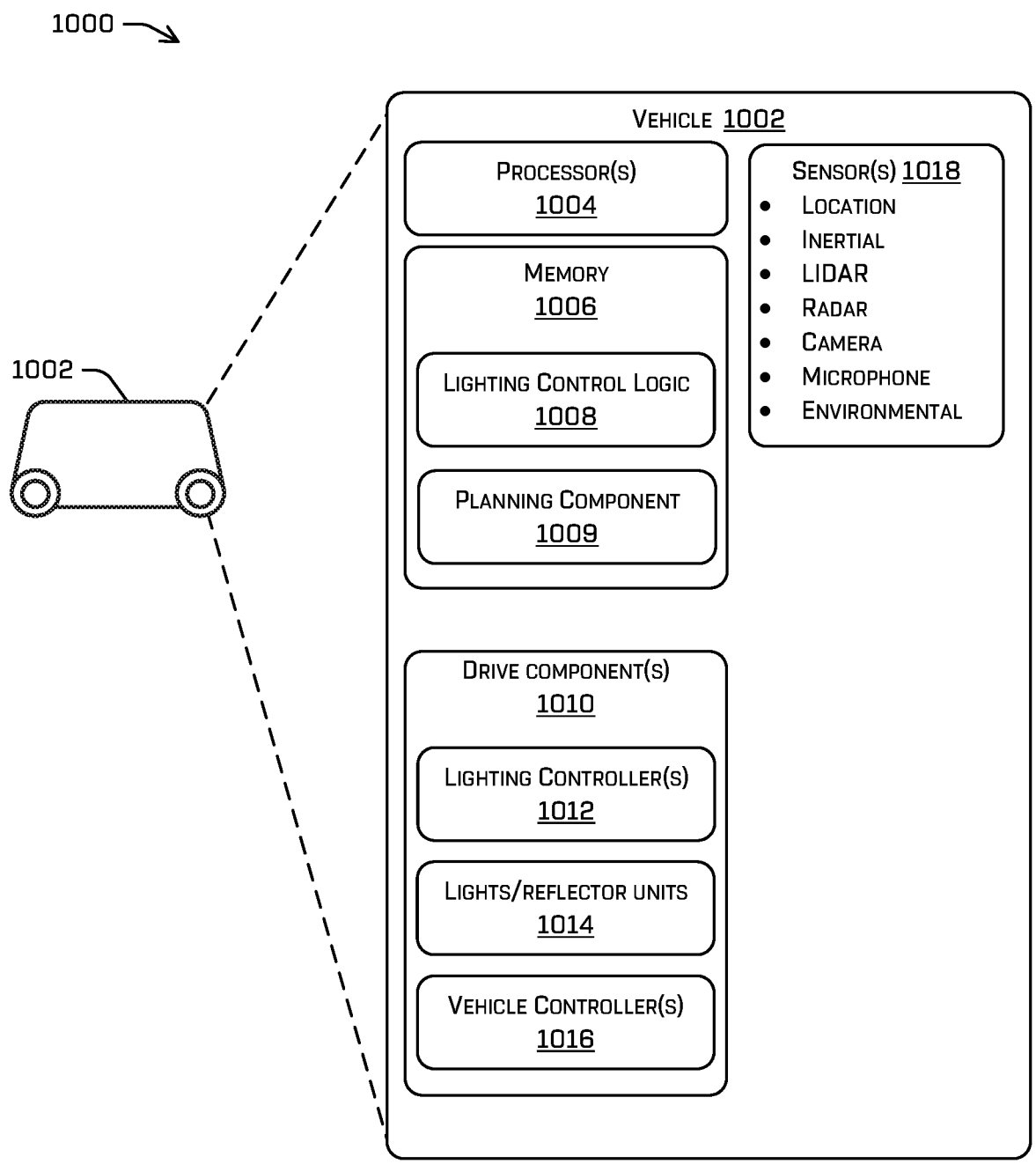
FIG. 10 is a block diagram of an example system for implementing various reflector units and active light systems, as described herein.

FIG. 10 is a block diagram of a system 1000, including a vehicle 1002, for implementing various reflector units and active light systems, as described herein. System 1000 may be configured to control operation of the vehicle, which may be an autonomous vehicle, and to control various lighting functions.

In some examples, system 1000 may include processor(s) 1004 and/or memory 1006. These elements are illustrated in combination in FIG. 10, although it is understood that they may be separate elements of system 1000, and that components of the system may be implemented as hardware and/or software, in some examples.

Processor(s) 1004 may include a uniprocessor system including one processor, or a multiprocessor system including several processors (e.g., two, four, eight, or another suitable number). Processor(s) 1004 may be any suitable processor capable of executing instructions. For example, in various implementations, processor(s) 1004 may be general-purpose or embedded processors implementing any of a variety of instruction set architectures (ISAs), such as the x86, PowerPC, SPARC, or MIPS ISAs, or any other suitable ISA. In multiprocessor systems, each processor 1004 may commonly, but not necessarily, implement the same ISA. In some examples, the processor(s) 1004 may include a central processing unit (CPU), a graphics processing unit (GPU), FPGA, Application Specific Integrated Circuit (ASIC), or a combination thereof. In some examples, the classifier and/or one or more of the detectors discussed herein may be implemented using any of these processor architectures. For example, the classifier and/or the one or more detectors may be FPGAs.

System 1000 may include memory 1006. In some examples, memory 1006 may include a non-transitory computer readable media configured to store executable instructions/modules, data, and/or data items accessible by processor(s) 1004. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to system 1000. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface(s), for example.

Furthermore, though illustrated as a single unit in FIG. 10, it is understood that processor(s) 1004 and memory 1006 may be distributed among multiple computing devices of the vehicle and/or among multiple vehicles, data centers, tele-operation centers, etc. In some examples, processor(s) 1004 and memory 1006 may conduct at least some of the techniques discussed herein.

Memory 1006 may include lighting control logic 1008, which may include algorithms to control illumination of various light/reflector units. For example, such algorithms may correspond to lighting profiles to be used on different models of vehicles and/or on such vehicles in different countries (e.g., having varying regulations). Accordingly, the algorithms could be applied to a lighting controller (e.g., 1012, described below) as needed.

System 1000 may include network interface(s) configured to establish a communication link (i.e., "network") between the system and one or more other devices. In various implementations, the network interface(s) may support communication via wireless general data networks, such as a Wi-Fi network, and/or telecommunications networks, such as, for example, cellular communication networks, satellite networks, and the like. In some examples, sensor data, such as a received signal, TDOA, depth measurement, output signal(s), return(s), and/or detection(s), etc., may be received at a first vehicle and transmitted to a second computing device. In some examples, at least some of the components of the LIDAR may be located at different devices. For example, a first vehicle may include the light emitter and light sensor and may generate the received signal but may transmit the received signal to a second vehicle and/or remote computing device.

Memory 1006 may include a planning component 1009 that can determine a path for vehicle 1002 to follow to traverse through an environment. For example, planning component 1009 can determine various routes and trajectories and various levels of detail. For example, planning component 1009 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, planning component 1009 can generate an instruction for guiding the autonomous vehicle along at least a portion of the route from the first location to the second location. In at least one example, planning component 1009 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for vehicle 1002 to navigate.

Planning component 1009 may generate a direction signal that indicates the direction of vehicle travel. A lighting controller (e.g., 1012, introduced below) may receive the direction signal and control illumination units based on this signal. For example, if vehicle 1002 is travelling so that a first end of the vehicle is leading the second end, then a reflector unit on the first end of the vehicle may function to behave as a white reflector and a reflector unit on the second end of the vehicle may function as a red reflector. On the other hand, if the vehicle is travelling so that the second end of the vehicle is leading the first end, then the reflector units may function oppositely, based on the direction signal from planning component 1009. System 1000 may include one or more drive components 1010. In some instances, the vehicle may have a single drive component. In some instances, drive component(s) 1010 may include one or more sensors to detect conditions of drive component(s) 1010 and/or the surroundings of the vehicle. Drive component(s) 1010 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights and/or one or more illumination units and light units for signaling or illuminating an exterior surrounding of the vehicle), and one or more other systems (e.g., cooling system, safety systems, onboard charging system, other electrical components such as a DC/DC converter, a high voltage junction, a high voltage cable, charging system, charge port, etc.). Drive component(s) 1010 may include a light controller 1012 and lights/reflector unit(s) 1014. Light controller 1012, which may comprise a portion of (or be the same as) controller 810 described above, may comprise one or more individual light controllers. Light controller 1012 may be communicatively coupled to one or more other light controllers, which in turn may be communicatively coupled to a vehicle controller 1016 that at least partially manages various operations of the vehicle. Lights/reflector unit(s) 1014 may comprise one or more illumination units (e.g., 102) and light units (e.g., 104). Lights/reflector unit(s) 1014 may also comprise various other lighting, such as license plate lights, side marker lights, and so on. Lighting of vehicle 1002 may be configured to operate in a fashion that allows for lighting redundancy on each end of the vehicle, as described above. Accordingly, in some implementations, control of lights and illumination units of vehicle 1002 may be shared among two or more such light controllers. For example, some lights and illumination units of the vehicle may be controlled by a first light controller while other lights and illumination units of the vehicle may be controlled by a second light controller.

Additionally, drive component(s) 1010 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of drive component(s) 1010. Furthermore, drive component(s) 1010 may also include one or more communication connection(s) that enable communication by the respective drive component with one or more other local or remote computing device(s).

System 1000 may include sensor(s) 1018 configured to localize the vehicle in an environment, to detect one or more objects in the environment, to sense movement of the vehicle through its environment, sense various optical characteristics (e.g., intensity and spectra) of incoming light, sense environmental data (e.g., ambient temperature, pressure, and humidity), and/or sense conditions of an interior of the vehicle (e.g., passenger count, interior temperature, noise level). Sensor(s) 1018 may include, for example, one or more LIDAR sensors, one or more cameras (e.g. RGB-cameras, intensity (grey scale) cameras, infrared cameras, depth cameras, stereo cameras), one or more magnetometers, one or more radar sensors, one or more sonar sensors, one or more microphones, one or more inertial sensors (e.g., accelerometers, gyroscopes), one or more GPS sensors, one or more wheel encoders, one or more drive system sensors, a speed sensor, a photosensor(s) (e.g., 814) and/or other sensors related to the operation of the vehicle.

EXAMPLE CLAUSES

A. An active light system configured to operate on a vehicle, the system comprising: a light source configured to emit colored light into an environment; a photosensor configured to generate a first signal in response to light incoming from the environment; and a controller configured to: receive the first signal; receive a second signal based on a direction of the vehicle; and activate the light source based at least in part on the first signal and the second signal.

B. The active light system of claim A, wherein the light source comprises a first LED configured to, when activated, generate and project a first color of light and a second LED configured to, when activated, generate and project a second color of light.

C. The active light system of claim B, wherein the controller is further configured to activate either the first LED or the second LED based, at least in part, on the second signal.

D. The active light system of claim B, wherein the first color of light and the second color of light comprise one or more of white, amber, or red, and wherein the first color of light differs from the second color of light.

E. An active light unit configured to operate on a vehicle, the active light unit comprising: a light source configured to, when activated, generate and project light toward a region external to the active light unit; a photosensor configured to detect incoming light from the region external to the active light unit; and an electronic module configured to: operate the light source in response to the photosensor detecting the incoming light and on a direction of travel of the vehicle.

F. The active light unit of claim E, wherein the light source comprises a first LED configured to, when activated, generate and project a first color of light and a second LED configured to, when activated, generate and project a second color of light.

G. The active light system of claim F, wherein the first color of light and the second color of light comprise one or more of white, amber, or red, and wherein the first color of light differs from the second color of light.

H. The active light unit of claim E, wherein the direction of travel of the vehicle includes a direction of motion of the vehicle or a most-recent direction of motion of the vehicle if the vehicle is parked.

I. The active light unit of claim E, further comprising baffles configured to control a range of incident angles of the incoming light.

J. The active light unit of claim E, wherein the light source comprises red LEDs that are located on a first end of the vehicle, and wherein the controller operates the red LEDs to be active in response to the photosensor detecting the light incoming from the region external to the active light unit while a direction of travel of the vehicle comprises the first end of the vehicle being behind a second end of the vehicle.

K. The active light system of claim E, wherein the electronic module is configured to: operate the light source to generate and project red light if the active light system is on a first end of the vehicle; and operate the light source to generate and project white light if the active light system is on the second end of the vehicle, wherein a direction of travel of the vehicle comprises the first end of the vehicle being behind a second end of the vehicle.

L. The active light unit of claim E, wherein the electronic module is further configured to control a brightness of the light source based, at least in part, on a brightness of the incoming light measured by the photosensor.

M. A method comprising: receiving a control signal that is based, at least in part, on a direction of travel of a vehicle; receiving an electronic signal from a photosensor; and operating light sources in response to the control signal and the electronic signal.

N. The method of claim M, further comprising controlling a brightness of the light sources based, at least in part, on a magnitude of the electronic signal from the photosensor.

O. The method of claim M, wherein the light sources comprise a first light emitting diode (LED) configured to, when activated, generate and project a first color of light and a second LED configured to, when activated, generate and project a second color of light.

P. The method of claim O, wherein the first color of light and the second color of light comprise one or more of white, amber, or red, and wherein the first color of light differs from the second color of light.

Q. The method of claim O, wherein operating the light sources in response to the control signal and the electronic signal comprises: activating the first LED if the vehicle is travelling in a first direction and activating the second LED if the vehicle is travelling in a second direction.

R. The method of claim M, wherein the direction of travel of the vehicle includes a direction of motion of the vehicle or a most-recent direction of motion of the vehicle if the vehicle is parked.

S. The method of claim M, wherein the photosensor is a first photosensor that is located on a first portion of the vehicle, the method further comprising: receiving a second electronic signal from a second photosensor located on a second portion of the vehicle; and determining if the light is from another vehicle or from sunlight based on the electronic signal from the first photosensor and the second electronic signal from the second photosensor.

T. The method of claim S, further comprising: activating or maintaining an on state of the light sources if the light is from another vehicle; and deactivating or maintaining an off state of the light sources if the light is from sunlight.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples. It is to be understood that other examples can be used and that changes or alterations, such as structural changes, can be made. Such examples, changes or alterations are not necessarily departures from the scope with respect to the intended subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A bidirectional vehicle having a first side and as second side opposed to the first side, the bidirectional vehicle comprising:
a first reflector unit disposed on the first side, the first reflector unit comprising:
a first surface; and
a first mask;
a second reflector unit disposed on the second side, the second reflector unit comprising:
a second surface; and a second mask;
one or more processors; and
one or more non-transitory computer-readable media storing instructions, that when executed by the one or more processors, cause the bidirectional vehicle to perform operations comprising:
based at least in part on the bidirectional vehicle operating in a first mode wherein the bidirectional vehicle is traveling in a first direction such that the first side is a front side of the bidirectional vehicle, positioning the first mask to allow light to reach the first surface and the second mask to block light from reaching the second surface; and
based at least in part on the bidirectional vehicle operating in a second mode wherein the bidirectional vehicle is traveling in a second direction such that the second side is the front side of the bidirectional vehicle, positioning the first mask to block light from reaching the first surface and the second mask to allow light to reach the second surface.

2. The bidirectional vehicle of claim 1, wherein the first reflector unit further comprises an actuator configured to operate the first mask between the first mode and the second mode.

3. The bidirectional vehicle of claim 2, wherein during the first mode, the actuator moves the first mask to a first position where the first mask allows the light to reach the first surface; and
wherein during the second mode, the actuator moves the first mask to a second position where the first mask blocks the light from reaching the first surface.

4. The bidirectional vehicle of claim 1, wherein when the bidirectional vehicle is operating in the first mode, the first reflector unit is configured to operates in a first state and reflect a first color; and
wherein when the bidirectional vehicle operating in the second mode, the first reflector unit is configured to operate in a second state and reflect a second color.

5. The bidirectional vehicle of claim 4, wherein when the bidirectional vehicle is operating in the first mode, the second reflector unit is configured to operate in a third state and reflect the second color; and
wherein when the bidirectional vehicle is operating in the second mode, the second reflector unit is configured to operate in a fourth state and reflect the first color.

6. The bidirectional vehicle of claim 1, wherein the first surface is configured to reflect a first color and the second surface is configured to reflect the first color.

7. The bidirectional vehicle of claim 1, wherein the first surface and the second surface are retroreflectors.

8. A reflector unit for a bidirectional vehicle comprising:
a first surface;
a second surface;
an actuator; and
a mask operable in one of a first state or a second state based, at least in part, on a direction of travel of the bidirectional vehicle, wherein the mask,
in the first state based on the direction of travel of the bidirectional vehicle being a first direction of travel, allows light to reach the first surface and blocks light from the second surface, and
in the second state based on the direction of travel of the bidirectional vehicle being a second direction of travel opposite the first direction of travel, blocks light from the first surface and allows light to reach the second surface.

9. The reflector unit of claim 8, wherein the mask comprises a mechanical shutter; and
wherein the actuator is configured to operate the mask between the first state and the second state.

10. The reflector unit of claim 9, wherein the actuator is configured to move the mask between the first state and the second state.

11. The reflector unit of claim 8, wherein the first surface comprises a first reflector; and
wherein the second surface comprises a second reflector.

12. The reflector unit of claim 8, wherein the first surface is configured to reflect a first color and the second surface is configured to reflect a second color.

13. A method comprising:
operating, based at least in part on a vehicle traveling in a first direction and using an actuator, a mask in a first state, wherein in the first state, the mask allows light to reach a first surface and blocks the light from a second surface; and
operating, based at least in part on the vehicle traveling in a second direction opposite the first direction and the actuator, the mask in a second state, wherein in the second state, the mask allows the light to reach the second surface and blocks the light from the first surface.

14. The method of claim 13, wherein the actuator moves the mask between the first state and the second state.

15. The method of claim 13, wherein the mask comprises a mechanical shutter.

16. The method of claim 13, wherein the first surface comprises a first retroreflector; and
wherein the second surface comprises a second retroreflector.

17. The method of claim 13, wherein the first surface comprises a retroreflector of a first color and the second surface comprises a retroreflector of a second color.

* * * * *